Nov. 13, 1951     T. J. LEHANE ET AL     2,574,925

HEATING SYSTEM CONTROL

Filed Aug. 26, 1948

INVENTORS.
Timothy J. Lehane
Lester E. Haskett
Edward W. Johnson

By Harvey M. Gillispie
Atty.

Patented Nov. 13, 1951

2,574,925

UNITED STATES PATENT OFFICE 2,574,925

HEATING SYSTEM CONTROL

Timothy J. Lehane, North Riverside, Lester E. Haskett, Riverside, and Edward W. Johnson, Chicago, Ill., assignors to Vapor Heating Corporation, Chicago, Ill., a corporation of Delaware Application August 26, 1948, Serial No. 46,274

5 Claims. (Cl. 236—9)

This invention relates to improvements in temperature control systems, and relates particularly to an improved temperature control system which is particularly suitable for use with heating apparatus of the general class in which streams of heated and unheated air are blended in predetermined proportions and introduced into an enclosed space to maintain the space at a desired temperature.

A principal object of the invention is to provide, in a heating system of the above-indicated character, novel and improved means for automatically adjusting the position of a heat delivery valve in response to temperature variations within the enclosed space during normal operations and which will also adjust the said valve in response to abnormal acceleration of the heat output from the heater and thereby avoid the discomfort and possible dangers incident to rapid acceleration of the heat output.

An additional object is to provide, in a temperature control system, automatic means including a control thermostat for controlling the delivery of heat into an enclosed space and means for adjusting the temperature setting of the control thermostat so that abrupt changes in the rate of heat delivered will be taken into account in the control functions of said thermostat.

Figure 1:
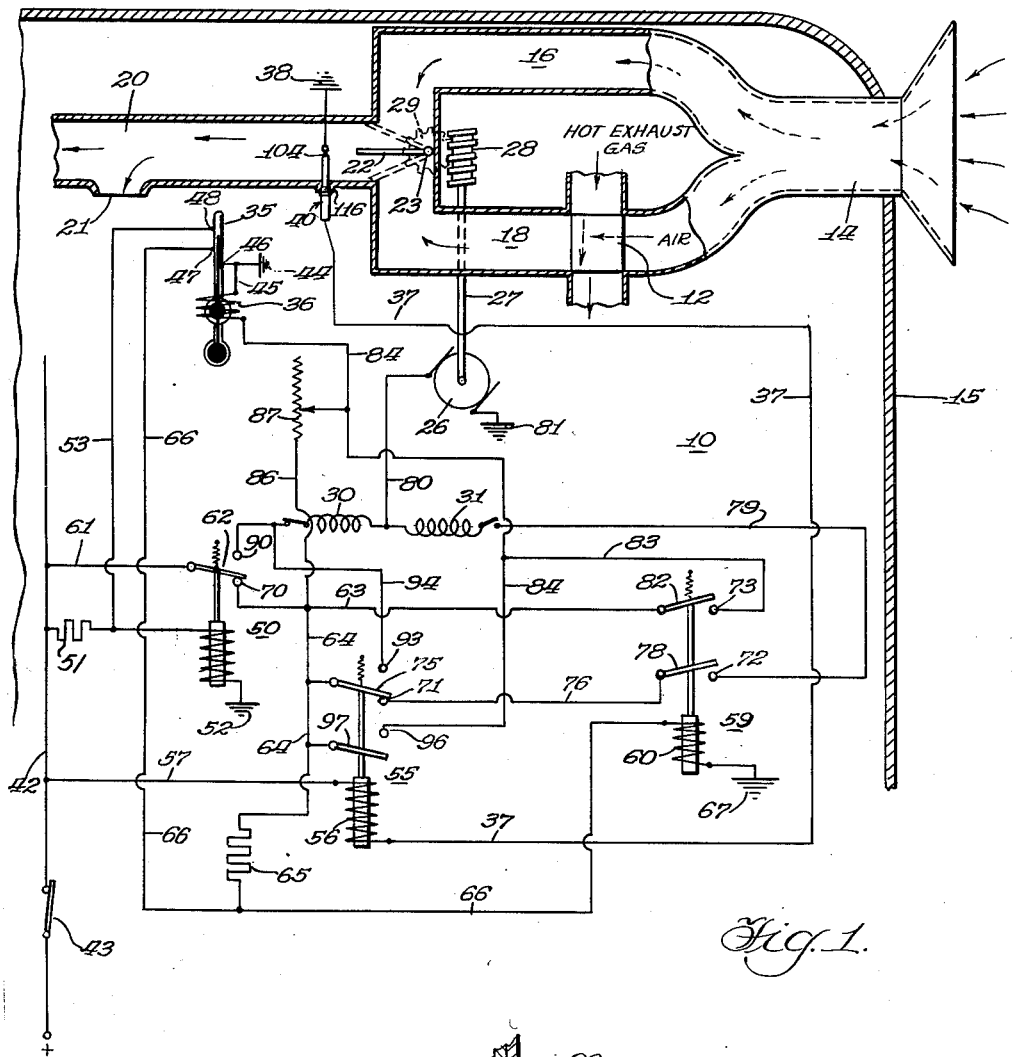
Figure 2:
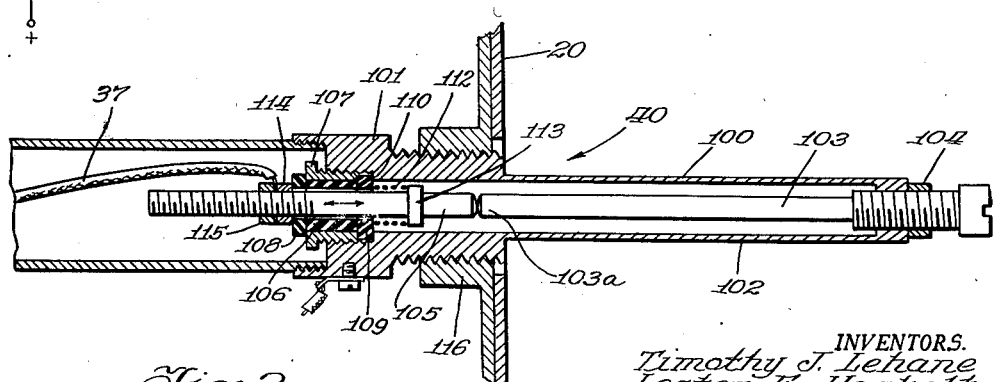

A preferred embodiment of this invention is illustrated in the accompanying drawing, wherein:

Fig. 1 is a schematic diagram of a heating and temperature control system designed more especially for use in aircraft; and Fig. 2 is a longitudinal sectional view of our improved heat-rate switch.

While there is no essential limitation as to the field of application of the subject invention, it is particularly well adapted for use in aircraft heating systems and other systems in which the exhaust gases from a combustion power unit is utilized; and the specific installation represented in Fig. 1 was designed for that purpose.

The area identified generally by reference numeral 10, in Fig. 1, may be considered to represent a compartment of an airplane, which is to be heated and temperature controlled by the system hereinafter described.

The principal heat supply is derived from a heat exchanger 12 of any suitable design supplied with heat from a suitable source not shown, for example, the hot exhaust gases from a combustion power unit.

Unheated air is taken in from outside the airplane through an intake conduit 14 which extends through a portion 15 of the aircraft. Ordinarily the draft of incoming air is produced by the movement of the airplane. However, when the system is installed in other situations, the air may be forced into the conduit 14 by means of a blower provided for that purpose.

The intake conduit 14 is divided to form two parallel branch conduits 16 and 18 which are jointly connected to the intake end of a distribution duct 20 having a suitable number of ports 21 which discharge into compartment 10.

A valve 22 is swingably mounted on a shaft 23 and is adjustably movable to any position between the two limiting positions indicated in dotted outline.

The heater 12 is situated in the branch conduit 18 and, of course, serves to heat the air passing therethrough, whereby a supply of heated and unheated air is available at the valve 22. A reversible electric motor 26 is connected through a drive shaft 27, worm 28 and worm wheel 29 to the valve shaft 23 and is operative to turn the valve 22 in either direction, depending upon which of its field windings 30 and 31 is energized. When the motor is energized through the circuit which includes field winding 30, the valve 22 will rotate counter-clockwise to admit an increased proportion of unheated air to distribution duct 20. Conversely, when the motor is energized through the circuit which includes field winding 31, the valve 22 will rotate clockwise to admit an increased proportion of heated air to distribution duct 20.

A thermostat 35, preferably of the mercury column type, is located within the compartment 10 and is responsive to temperature variations therein; and said thermostat is provided with an electric heating coil 36, the function of which is to adjust the temperature setting of the thermostat and to also cause accelerated expansion of the mercury column, under certain conditions, to produce cycling operations of the thermostat.

A heat-rate switch 40, detailed in Fig. 2, is mounted on and projects into the interior of distributing duct 20 where it is subjected to the heat therein. The description of said heat-rate switch will follow completion of the description of the system as a whole; and it will suffice, for the moment, to state that said heat-rate switch has a contact which is normally closed and thus connects the conductor 37, Fig. 1, to ground at 38. But whenever the temperature within the distributing duct 20 suddenly rises to a substantial extent, as distinguished from gradual temperature increases, the heat-rate switch contact will open and thereby so condition the control circuits as to move the heat control valve in a direction to shut off the heated air and to increase the cooling, during such period of abnormal heat acceleration.

Current is supplied to the system through a main supply conductor 42, including a main switch 43, which remains closed whenever the system is in operation.

The mercury column of thermostat 35 is grounded at 44 through a conductor 45 and contact terminal 46; and said thermostat is provided with two additional contact terminals 47 and 48 which are so placed as to be engageable by the mercury column under conditions corresponding to certain ambient temperatures. When the temperature within the compartment 10 is at a normal value, say 72° to 74° F. the end of the mercury column will stand at a point between terminals 47 and 48, except in the event of an extraordinary occurrence which causes extra biasing heat to be applied to the thermostat by means of heating coil 36—all of which presently will be explained.

It will initially be assumed that the temperature within compartment 10 is normal and that the end of the mercury column stands between contact terminals 47 and 48; and that the contact of heat-rate switch 40 is closed. Also that switch 43 is closed.

A first relay 50 has a winding which is connected to main supply conductor 42 through a current-limiting resistor 51, and is grounded at 52. Said first relay is accordingly energized, since the conductor 53 is not grounded at 44, inasmuch as the mercury column of thermostat 35 is not engaged with contact terminal 48.

A second relay 55 has a winding 56 which is included in an energizing circuit extending from main supply conductor 42 through conductors 57 and 37 and the closed contact of heat-rate switch 40 to ground at 38. Assuming normal temperature conditions at the heat-rate switch 40, the second relay 55 is energized; and it will remain energized unless and until the contact of heat-rate switch 40 is opened or the manually operated switch 43 is opened.

A third relay 59 has a winding 60 which is included in an energizing circuit extending from main supply conductor 42 through conductor 61, relay contact arm 62, conductors 63 and 64, current-limiting resistor 65, conductor 66, and the winding 60 to ground at 67. But conductor 66 is grounded at 44 through the mercury column of thermostat 35 and conductor 45. Hence, relay 59 is not energized. Since relays 50 and 55 are both energized, it will be apparent that the contacts at 70 and 71 are closed and that all other relay contacts are open. Neither energizing circuit of motor 26 is closed and the valve 22 is at rest.

Now let it be assumed that the temperature in the enclosed space 10 has dropped, so that the mercury column of thermostat 35 breaks contact at terminal 47. This removes the ground at 44 from conductor 66 and thus from one terminal of the winding 60 of the third relay 59. Thereupon, relay 59 is energized and closes its contacts at 72 and 73. This effects closure of two previously opened circuits. One of these circuits extends from main supply conductor 42 through conductor 61, contact arm 62, contact 70, conductors 63 and 64, contact arm 75, contact 71, conductor 76, contact arm 78, contact 72, conductor 79, motor field winding 31, conductor 80 and the armature of motor 26 to ground at 81. This energizes the motor to run in the direction to cause valve 22 to rotate clockwise so as to increase the proportion of heated air admitted to distribution duct 20. The other of the two previously open circuits, closed as a result of energization of relay 59, extends from main supply conductor 42 through conductor 61, contact arm 62, contact 70, conductor 63, contact arm 82, contact 73, conductors 83 and 84, and the heating coil 36 to ground at 44. Closure of the last-described circuit gives rise to a heavy flow of current through heating coil 36 and causes a quick expansion of the mercury column of thermostat 35, thereby re-establishing the ground on conductor 66, consequently de-energizing relay 59. Accordingly, relay 59 remains energized only for a brief instant, but long enough to bring about a slight rotation of valve 22 in the clockwise direction. If the motor were allowed to run until the ambient temperature in space 10 caused the mercury column to re-engage contact 47, the valve 22 would move so far that presently the space temperature would be excessively high. If, following the above-described modulation of valve 22, the ambient temperature does not maintain the mercury column in contact with contact terminal 47, the relay 59 will again be energized, causing a further slight rotation of valve 22 in the clockwise direction; and this will be repeated, if necessary, until finally the ambient temperature is sufficient to hold the mercury column at a point where it maintains contact with said contact terminal 47.

Heating coil 36 is also connected in an energizing circuit extending from the junction of connectors 63 and 64 through conductor 86, variable resistor 87 and conductor 84, the purpose of which is to enable the mercury column to be adjusted so as to secure a desired control temperature for the space 10.

Should the ambient temperature increase to such an extent as to cause the mercury column to engage contact terminal 48, the conductor 53 would be grounded at 44, through the mercury column, thus putting ground on both terminals of the winding of relay 50, causing de-energization of the latter. This results in the opening of contact 70 and closure of contact 90, which establishes an energizing circuit for motor 26 extending from main supply conductor 42 through conductor 61, contact arm 62, contact 90 conductor 91, motor field winding 30 and the armature of motor 26 to ground at 81. The motor is thereby caused to rotate in the direction to effect a counter-clockwise rotation of valve 22, thus admitting an increased proportion of unheated air from conduit 16 to distribution duct 20, and it will continue so to do until the ambient temperature has dropped sufficiently to cause the mercury column to disengage contact terminal 48, whereupon relay 50 will again be energized, thereby opening the motor circuit through field winding 30. During this movement of the valve 22 to increase the delivery of unheated air, the auxiliary heater 36 is deenergized by opening of its energizing circuit at contact 70 of relay 50. It will be observed that the opening of this auxiliary heater circuit results in cooling the thermostat 35 so as to cause its mercury column to recede from the upper contact 48 and thereby produce a cycling operation of the thermostat at its high temperature contact 48. This cycling operation at the upper contact will interrupt the movement of valve 22 toward its full cooling position and thereby avoid excessive cooling of the cabin 10.

The heat exchanger 12, as herein shown, is heated by means of exhaust gases discharged from a combustion power unit (not shown) used to propel the aircraft or other vehicle on which the improved temperature control system is installed. Consequently, the supply of heat to the said exchanger 12 varies during the acceleration and deceleration of the power unit. Any variation in the heat delivered from the heat exchanger, during normal operation of the combustion power unit, or during deceleration thereof, will be compensated by application and removal of extra heat to the thermostat to temporarily adjust its functional setting and by automatic adjustment of the proportioning valve 22 in response to the requirements of the space thermostat 35. In the event of an acceleration of the power unit and a consequent sharp rise in the temperature of the air delivered from the heat exchanger 12 the normally closed contact of heat-rate switch 40 will open at once and thereby remove the ground 38 from winding 56 of relay 55, causing de-energization of said relay. This effects closure of a shunt path across the two fixed contacts of relay 50 via conductors 63 and 64, contact arm 97 of relay 55, fixed contact 93 and conductor 94. Hence, the motor 26 is energized, irrespective of whether relay 50 is energized or de-energized, to rotate valve 22 in the counter-clockwise direction, thus reducing the proportion of heated air admitted to distribution duct 20. In fact it is desirable under such condition to entirely shut off the delivery of heat into the distributing duct and thereafter adjust the valve 22 to the desired open position when the abnormal heat acceleration has subsided. Therefore, simultaneously with the closure of the above-described shunt path, an energizing circuit is closed through the heating coil 36, in shunt to the variable resistor 87. This heating circuit extends from ground 44 through heating coil 36, conductor 84, contact 96 of relay 55, closed contact arm 97 and conductor 64, whence it may follow either of two paths to main supply conductor 42, depending upon whether relay 50 is energized or de-energized. If said relay is energized as shown in the drawing, the circuit will proceed by way of conductor 63, contact 70, contact arm 62 and conductor 61. If, on the other hand, relay 50 is deenergized, the circuit will proceed by way of contact arm 75, fixed contact 93, conductor 94, contact 90, contact arm 62 and conductor 61. In either case, the heating current delivered to the electrical heater 36 of thermostat 35, will be sufficient to adjust the thermostat to a lower temperature setting so as to cause the mercury column to close a shunt circuit through conductors 53, 51 and contact 48 to the ground 44. This shunt circuit deenergizes the relay 50 and thereby removes all electrical heat from the thermostat 35. As soon as the abnormal heat acceleration has subsided, the heat-rate switch 40 will again close to re-establish an energizing circuit through winding 56 of relay 55 and thereby return the control functions to the thermostat 35 and the relays 50 and 59. After the heat from auxiliary heater 36 is dissipated, the said thermostat 35 will again break the shunt circuit at contact 48 and thereby re-establish an energizing circuit for relay 50.

The heat-rate switch 40, Fig. 2, illustrates one suitable form of switch and comprises a metal casing 100, consisting of an externally threaded screw plug 101, and a thin-walled tube 102, which may be an integral part of the plug. An elongate rod 103 is threaded into the distal end of the tube 102 and extends axially therethrough. The lengthwise portion of said rod is adjustable by means of its threaded engagement with the tube, and it can be locked by means of a nut 104 in any position to which it may be set. The rod 103 and casing 100 may be of the same metal; and aluminum is very suitable.

The free end 103a of rod 103 normally makes end-to-end contact, as shown, with a second rod 105 co-axial therewith, which is insulated from the casing 100, and to which is connected the conductor 37.

Rod 105 is slidably movable axially in the bore of a sleeve 106 of insulating material, which, in turn, is mounted in the bore of an externally threaded metal bushing 107, screwed into the plug 101. Two collars 108 and 109 of insulating material are located at either end of bushing 106, and the last-mentioned collar is clamped between an annular shoulder 110 and the end of bushing 107. A coil spring 112 encircling rod 105 bears at one end against the collar 109 and at the other end against a flange 113 formed on rod 105. A pair of nuts 114, 115 are threaded onto rod 105 and grip between them the terminal of conductor 37, while functioning as an adjustable stop to limit the axiswise movement of rod 105 toward rod 103.

The spring 112 normally holds rod 105 against the end of rod 103, and there may be a very slight clearance between collar 108 and the contiguous face of nut 114, under normal conditions, so that good contact will obtain between the two rods.

The plug 101 is screwed into a flange 116 attached to the wall of the duct 20, with the tube 102 projecting into the interior of said duct, so that the tube is immediately affected by any change in the rate of heat output from the heater 12. If a change of temperature within the duct occurs gradually, the tube 102 and rod 103 will expand at approximately the same rate and the contact between the two rods 103 and 105 will continue. But should there occur an abrupt and marked temperature increase within duct 20, such as would tend to cause a sharp temperature rise within the space 10, the tube 102 will expand at a distinctly more rapid rate than rod 103 and will, consequently, move said rod 103 sufficiently to break its contact with rod 105. This follows from the fact that the tube 102 is directly exposed to the heat, while the rod is shielded by the tube; and from the further fact that the tube has a large exposed surface area, compared to its mass, wherefore its temperature rises very rapidly, while that of the rod does not.

Any gradual temperature increase within duct 20 tending to cause an excessively high temperature within the space 10 will be counteracted by the response of thermostat 35 and, therefore, does not require de-energization of relay 55 to offset it.

From the above description it will be seen that the invention provides a heating and temperature-regulating system which is particularly well adapted for use in situations where the principal heat supply is derived from a combustion power unit, which is accelerated and decelerated from time to time; and that an improvement in temperature regulation is so effected as to prevent delivery of excessively hot air into the space being controlled in event of a sudden acceleration in the delivery of heat to the air heater.

We claim:

1. The combination in a heating and temperature control system, of a distribution duct for supplying heat to an enclosed space, of a conduit for heated air and a conduit for unheated air leading into said distributing duct, an air heater supplied with a variable volume of heat, a valve for regulating the proportion of heated and unheated air admitted to said distributing duct, a heat-rate switch positioned to respond to the temperature of the air within said distributing duct and having a normally closed contact which is operative to open whenever the heat-rate switch is subjected to an abrupt and substantial temperature increase, a reversible electrical motor for operating said valve, means for normally controlling the operations of said motor in conformity with temperature variations within the enclosed space comprising a thermostat responsive to the temperature of said space, a first relay normally energized but subject to de-energization when the space temperature affecting said thermostat reaches a certain high value to close an energizing circuit through said motor to operate said valve in a direction to increase the proportion of unheated air admitted to said distributing duct, a second relay having its winding included in circuit with the contact of said heat-rate switch and, therefore, normally energized, a third relay under the control of said thermostat and subject to energization only when the space temperature affecting said thermostat has dropped below a certain low value, said first, second and third relays being conjointly operative, when all are energized, to close a circuit through said motor to operate said valve in a direction to increase the proportion of heated air admitted to said distributing duct.

2. The combination according to claim 1 wherein the winding of said third relay is included in an energizing circuit which is closed only when said first relay is energized.

3. The combination according to claim 1 wherein the winding of said third relay is shunted out by said thermostat when the temperature affecting said thermostat is at and above the certain low temperature value, said third relay being otherwise effective to close a motor circuit for increasing the proportion of heated air admitted to said duct, provided said first relay is also energized.

4. A temperature control for an air blending heating system in which a proportioning valve and a reversible electrical motor for adjusting the position of the valve are utilized to proportionately blend air streams of different temperatures delivered to an enclosed space, means including a thermostat responsive to the temperature within the enclosed space for controlling the forward and reverse movements of said motor, and means for adjusting the functional setting of said thermostat to offset abrupt accelerations of said air temperature delivered regardless of the temperature of the space and comprising an electrical heater for applying heat to said thermostat and means for controlling the effectiveness of said heater including a heat-rate switch responsive to said abrupt accelerations in the temperature of the air delivered.

5. A temperature control system as defined in claim 4 in which the heat-rate switch responds also to deceleration of the air temperature to open an energizing circuit for said electrical heater.

TIMOTHY J. LEHANE.
LESTER E. HASKETT.
EDWARD W. JOHNSON.

REFERENCES CITED

The following references are of record in the file of this patent:

UNITED STATES PATENTS

| Number | Name | Date |
| --- | --- | --- |
| 2,164,352 | Sargent | July 4, 1939 |
| 2,328,280 | Jones | Aug. 31, 1943 |
| 2,331,476 | Jones | Oct. 12, 1943 |
| 2,332,212 | Fillo | Oct. 19, 1943 |
| 2,420,043 | Johnson | May 6, 1947 |